Patented Apr. 12, 1927.

1,624,155

UNITED STATES PATENT OFFICE.

SAMUEL AMSTER, OF RICHMOND, KENTUCKY.

TOBACCO WAX AND PROCESS FOR PRODUCING THE SAME.

No Drawing. Application filed March 12, 1925. Serial No. 14,921.

This invention relates to a process by which a wax-like substance is extracted from the tobacco plant, and also to the product which is the result of such process.

An object of the invention is the provision of a process for extracting a wax-like substance from the tobacco plant by which the leaves and stems may be still employed for smoking and chewing tobacco.

Another object of the invention is the provision of a wax-like substance extracted from the tobacco plant which will not ignite and therefore may be employed as an insulation for treating materials to cause the same to be fireproof.

A further object of the invention is the provision of a wax-like substance extracted from the tobacco plant which may be employed in the manufacture of shoe polishes and varnishes.

This invention will be best understood from a consideration of the following detailed description; nevertheless it is to be understood that the invention is not confined to the disclosure, being susceptible of such changes and modifications which shall define no material departure from the salient features of the invention as expressed in the appended claims.

In carrying out my invention I place the leaves and stems of the tobacco plants when either green or cured, in hot water at a temperature below 212° F. and allow them to remain in this condition for approximately forty-eight hours. While the water is maintained hot, it is preferable that the water should not be brought to the boiling point, since all the wax-like substance may be extracted without resorting to boiling. The stems and leaves are approximately covered with water and such an approximation of the quantity of the leaves, stems and water gives the proper proportion of the ingredients.

After such time, the liquor is drawn off and the stems and leaves are dried and may be used for smoking or chewing after treatment in the usual manner. The extraction eliminates in a great measure such elements of the plant which are injurious to the human system, such as alkaloids, soluble mineral matter, and protein compounds.

The drawn liquor is then dissipated of the water by evaporation in vacuum tanks or in open pans over a fire. The time required for this step is measured only by the period required for a complete evaporation of the moisture and is further influenced by the quantity of liquor to be evaporated. The water is evaporated until a wax-like substance is had and only a sufficient temperature is employed for the purpose which will not modify the structure of the wax-like substance. Furthermore where the concentration of the infusion is produced in vacuum tanks there will be no danger whatever of any modification of the wax-like substance.

The residue is a wax-like substance of dark brown color inclined to black, is easily kneadable, and is resistant to a flame. It may be employed in any relation in which wax may be used except in the production of candles because of its non-inflammability.

Since it is non-inflammable it is used in treating materials for fire proofing bands or beltings, fabrics and the like and materials used in the construction of buildings.

When treated with the proper solvents, it may be used in the manufacture of shoe polishes or pastes and in the production of varnishes.

What I claim is:

A process for extracting the wax-like substance from tobacco leaves and stems which comprises leaching the leaves and stems with hot water at a temperature below 212° F. for approximately 48 hours, then draining the hot liquid from the leached leaves and stems, and removing the water from the hot liquid by evaporation, whereby the wax-like substance is recovered as a residue therefrom.

SAMUEL AMSTER.